United States Patent
Lee et al.

(10) Patent No.: US 7,421,719 B2
(45) Date of Patent: Sep. 2, 2008

(54) DISC RECORDING/REPRODUCING APPARATUS

(75) Inventors: Jeung-rak Lee, Suwon-si (KR); Yong-hoon Lee, Suwon-si (KR); Jae-yong Eum, Suwon-si (KR); Hong-kyun Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 11/362,716

(22) Filed: Feb. 28, 2006

(65) Prior Publication Data
US 2006/0277557 A1 Dec. 7, 2006

(30) Foreign Application Priority Data
Jun. 7, 2005 (KR) ............... 10-2005-0048421

(51) Int. Cl.
*G11B 17/04* (2006.01)
(52) U.S. Cl. ........................... 720/643
(58) Field of Classification Search ........... 720/643, 720/600, 601, 607, 613, 622, 623, 635, 641, 720/644, 664
See application file for complete search history.

(56) References Cited

U.S. PATENT DOCUMENTS

| 7,340,753 | B2 * | 3/2008 | Inata et al. ............ 720/643 |
| 2004/0052167 | A1 | 3/2004 | Tsutsumi et al. |

FOREIGN PATENT DOCUMENTS

| JP | 2001-93255 | 4/2001 |
| JP | 2003-109282 | 4/2003 |
| JP | 2004-5880 | 1/2004 |
| KR | 130432 | 11/1997 |
| KR | 2004-39179 | 5/2004 |
| KR | 2004-39182 | 5/2004 |

* cited by examiner

*Primary Examiner*—Allen T Cao
(74) *Attorney, Agent, or Firm*—Stein, McEwen & Bui, LLP

(57) ABSTRACT

A disc recording/reproducing apparatus includes a main frame, a disc cartridge including a case with an opening on a bottom thereof to expose a disc-type recording medium and a window on a sidewall thereof, a shutter mounted in the case to expose and cover the opening, a rotary wheel operating in association with the shutter, and a latch unit formed at one side of the case to control rotation of the rotary wheel, a tray mounting the disc cartridge and moving with respect to the main frame, a shutter opening/closing unit connected to one side of the main frame, a rack member of a cantilever type contacting with the rotary wheel, and first and second connection ribs connected to a static part of the shutter opening/closing unit, and a cam guiding the rack member distanced in relation to or from the latch unit, during shutter opening/closing operations.

16 Claims, 10 Drawing Sheets

DISC RECORDING/REPRODUCING APPARATUS

CROSS-REFERENCE TO RELATED APPLICATIONS

This application claims benefit under 35 U.S.C. §119(a) of Korean Patent Application No. 2005-48421, filed Jun. 7, 2005, in the Korean Intellectual Property Office, the disclosure of which is incorporated herein by reference.

BACKGROUND OF THE INVENTION

1. Field of the Invention

Aspects of the present invention relate to a disc recording/reproducing apparatus and, more particularly to a disc cartridge loading device for receiving a disc cartridge in a disc recording/reproducing apparatus.

2. Description of the Related Art

Generally, disc recording/reproducing apparatuses that record and reproduce information using a disc-type recording medium comprising an optical disc such as a compact disc (CD) or a digital versatile disc (DVD) are widely used to record and reproduce music and images i.e., still or video images. Such disc recording/reproducing apparatuses are also widely used as a storage medium of an information processor such as a computer.

In the disc recording/reproducing apparatus, upon loading the disc-type recording medium on a tray, the tray is moved from a withdrawn position to a recording/reproducing position. Then, a turntable that constitutes a rotary driving section rises from a lower position to float up and drive the recording medium. In this state, recording or reproducing of information is performed through moving an optical pickup in a radial direction of the disc-type recording medium.

As to disc-type recording media for the disc recording/reproducing apparatus, such as the optical disc, continue to advance for high density, and a single-layer optical disc having a capacity of 25 GB has been introduced. However, as high-density disc recording/reproducing apparatuses appear, a problem of signal errors caused by foreign substances, such as dust or finger prints, is generated. To overcome such a problem, an optical disc cartridge is used.

A cartridge case has an opening which is closed by a shutter when not in use and opened by the shutter when the cartridge is mounted on the recording/reproducing position in order to perform optical recording/reproducing. Accordingly, the cartridge needs a locking device for maintaining the closed state of the shutter, and a shutter opening device for releasing the closed state of the shutter when the cartridge is mounted on the recording/reproducing position.

Japanese Patent Publication No. 2004-5880 discloses an example of the disc recording/reproducing apparatus as described above. FIG. 1 is a longitudinal section view of a disc recording/reproducing apparatus disclosed in Japanese Patent Publication No. 2004-5880, for illustrating a cartridge holder as completely inserted by a loading device. FIG. 2 illustrates the operation of a shutter opened and closed by a rack member of FIG. 1.

Referring to FIGS. 1 and 2, a cartridge holder 464 is inserted to a predetermined position from a withdrawn position by the loading device. After a disc cartridge 401 is completely inserted into the disc recording/reproducing apparatus in an arrowed direction A, a rack member 471 engaged with the cartridge holder 464 is slid in an arrowed direction B by a rack driving device. Accordingly, an inner loader 404 in the disc cartridge 401 is rotated by the rack member 471, thereby opening the shutter of the disc cartridge 401. The shutter of the disc cartridge 401 can be closed through performing the above processes in reverse order.

According to the above structure of FIGS. 1 and 2, however, since the rack member 471 is shaped similar to a stick, noise can be generated due to friction between the rack member 471 and a side of the disc cartridge 401, for example, a leading end 436*bb* of an unlocking arm 436*a* constituting a locking member 436 or a window part 435 of the disc cartridge 401. In addition, the contacting portion between the rack member 471 and the side of the disc cartridge 401 can be damaged.

In order to overcome the above and/or other problems, a cam structure has been applied in the art. A disc recording/reproducing apparatus applying the cam structure is disclosed in Japanese Patent Publication No. 2003-109282 (publication date of Apr. 11, 2003).

FIG. 3 illustrates the structure of a shutter opening and closing mechanism disclosed in the Japanese Patent Publication No. 2003-109282. Referring to FIG. 3, a shutter opening and closing mechanism 65 is provided with an opening and closing base 66 and is also provided with retainer portions 67 on both ends thereof in a lengthwise direction to receive springs 68. A rack 71 is fitted at an intermediate position of the opening and closing base 66 in the lengthwise direction thereof. The rack 71 is provided with engaging clicks 72 on both ends in the lengthwise direction thereof, respectively. These engaging clicks 72 are adapted to engage with engagement openings 73 of the opening and closing base 66. Moreover, the rack 71 is energized to protrude from the surface of the base 66 by springs 74.

Furthermore, the opening and closing base 66 is provided with a phase shift rectifying member 75 at a part on a front end side at one end of the opening and closing base 66 in the lengthwise direction thereof. The rectifying member 75 is provided with a pair of engaging clicks 76. These engaging clicks 76 are engaged with engagement openings 77, and are biased by a spring 78 in a direction in which the engaging clicks 76 project. Moreover, another phase shift rectifying member 79 is fitted on a rear end side of the base 66. Engaging clicks 80 on both ends of the phase shift rectifying member 79 engage with engagement openings 81 of the base 66. Moreover, the phase shift rectifying member 79 is biased by a spring 82 in a direction in which the phase shift rectifying member 79 springs out.

However, the above structure as disclosed in Japanese Patent Publication No. 2003-109282 is very complicated and requires many parts, thereby promoting an increased cost and size of the apparatus.

SUMMARY OF THE INVENTION

An aspect of the present invention is to promote addressing the above problems and/or other disadvantages and to provide various aspects of the present invention, such as described below.

Accordingly, an aspect of the present invention is to provide a disc recording/reproducing apparatus restraining contact between a restraining part of the disc cartridge and a shutter opening/closing unit of a disc cartridge loading device in a disc recording/reproducing apparatus, during an opening and a closing operation of a shutter, the shutter selectively exposing an opening in the disc cartridge to expose a disc-type recording medium, when the disc cartridge is positioned in a recording/reproducing position.

Another aspect of the present invention is to provide a disc recording/reproducing apparatus in which a structure of a shutter opening/closing unit is simplified.

In order to achieve the above described and/or other aspects of the present invention, there is provided a disc recording/reproducing apparatus including a main frame, a disc cartridge which includes a case having an opening on a bottom thereof to expose a disc-type recording medium and a window on a sidewall thereof, a shutter mounted in the case to selectively expose and cover the opening, a rotary wheel operating in association with the shutter and having a segment gear and a concave cut on a rim thereof, and a latch unit formed at one side of the case to control rotation of the rotary wheel, a tray mounting the disc cartridge and moving linearly forward and backward with respect to the main frame, a shutter opening/closing unit which includes a static part connected to one side of the main frame, a rack member connected to one side of the static part in a cantilever type arrangement and selectively contacting with a segment gear of the rotary wheel, and first and second connection ribs connected to both ends of the static part in a cantilever type arrangement and having first and second shutter opening/closing projections at one end thereof, respectively, and a cam guiding the rack member to be contacted with the segment gear and distanced from, or avoiding contact with, a restraining part of the disc cartridge, such as the latch unit, during the shutter opening/closing operations.

The cam includes a cam groove formed on an upper surface of the tray to guide the shutter opening/closing unit to be distanced or spaced from, or in relation to, the disc cartridge when the shutter opening/closing unit is located in corresponding relation to the latch unit and to be drawn out toward the disc cartridge when the shutter opening/closing unit is located in corresponding relation to a window formed at the disc cartridge.

The disc recording/reproducing apparatus in an aspect of the present invention further includes guide projections at one end of the first and the second connection ribs and the rack member, which are slid along the cam groove. The static part, the first and the second connection ribs, the first and the second shutter opening/closing projections, and the guide projections are typically integrally formed, such as by injection molding.

The main frame of the disc recording/reproducing apparatus in an aspect of the present invention is further provided with a cut-out portion at one side thereof, and the static part of the shutter opening/closing unit is provided with fitting parts at both ends thereof, for engagement with an end of the cut-out portion of the main frame.

Further, according to an aspect, and/or other aspects, of the present invention, there is provided a disc recording/reproducing apparatus including: a main frame; a tray linearly moving in and out with respect to the main frame; a disc cartridge mounted on an upper surface of the tray and having a shutter associated therewith for selectively exposing and covering an opening in the disc cartridge that exposes a disc-type recording medium; a shutter opening/closing unit which includes a static part fixed on one side of the main frame, and an opening/closing operation part relatively operating with a shutter operating part of the disc cartridge, the shutter operating part to operate in association with the shutter, the opening/closing operation part being connected to the static part in a cantilever type arrangement to be resiliently moved; and a cam formed at an upper surface of the tray to guide the shutter opening/closing unit to be positioned proximate to the shutter operating part of the disc cartridge and distanced from a restraining part of the disc cartridge, during the shutter opening/closing operations, the restraining part selectively restrains movement of the shutter operating part to selectively retain the shutter in a predetermined position when the shutter covers the opening in the disc cartridge that exposes the disc-type recording medium.

According to an aspect of the present invention, the static part and the opening/closing operation part are typically integrally formed, such as by injection molding. Also, the static part is provided with a fitting part to be fit with a thickness portion, or fitting portion, of the main frame.

As described above, in the disc recording/reproducing apparatus according to an aspect of the present invention, the shutter opening/closing unit is guided away from the restraining part of the disc cartridge by the cam, thereby effectively promoting a restraining of damage of the disc cartridge and noise.

Also, according to another aspect of the present invention, by manufacturing the shutter opening/closing unit as one body, the number of parts and size of the disc recording/reproducing apparatus can be reduced.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
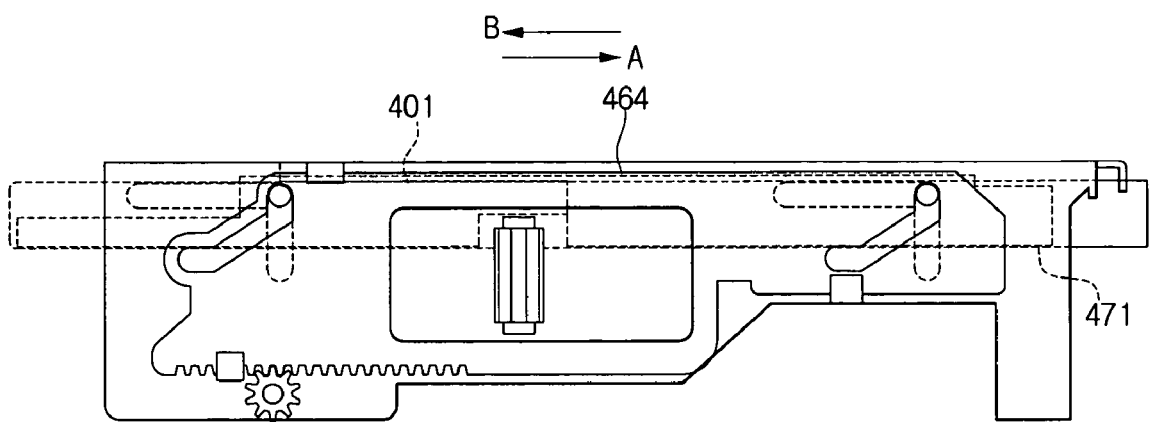
FIG. 1 is a longitudinal sectional view illustrating the structure of a disc recording/reproducing apparatus, such as disclosed in Japanese Patent Publication No. 2004-5880, showing a cartridge holder completely inserted by a loading device.
Figure 2:
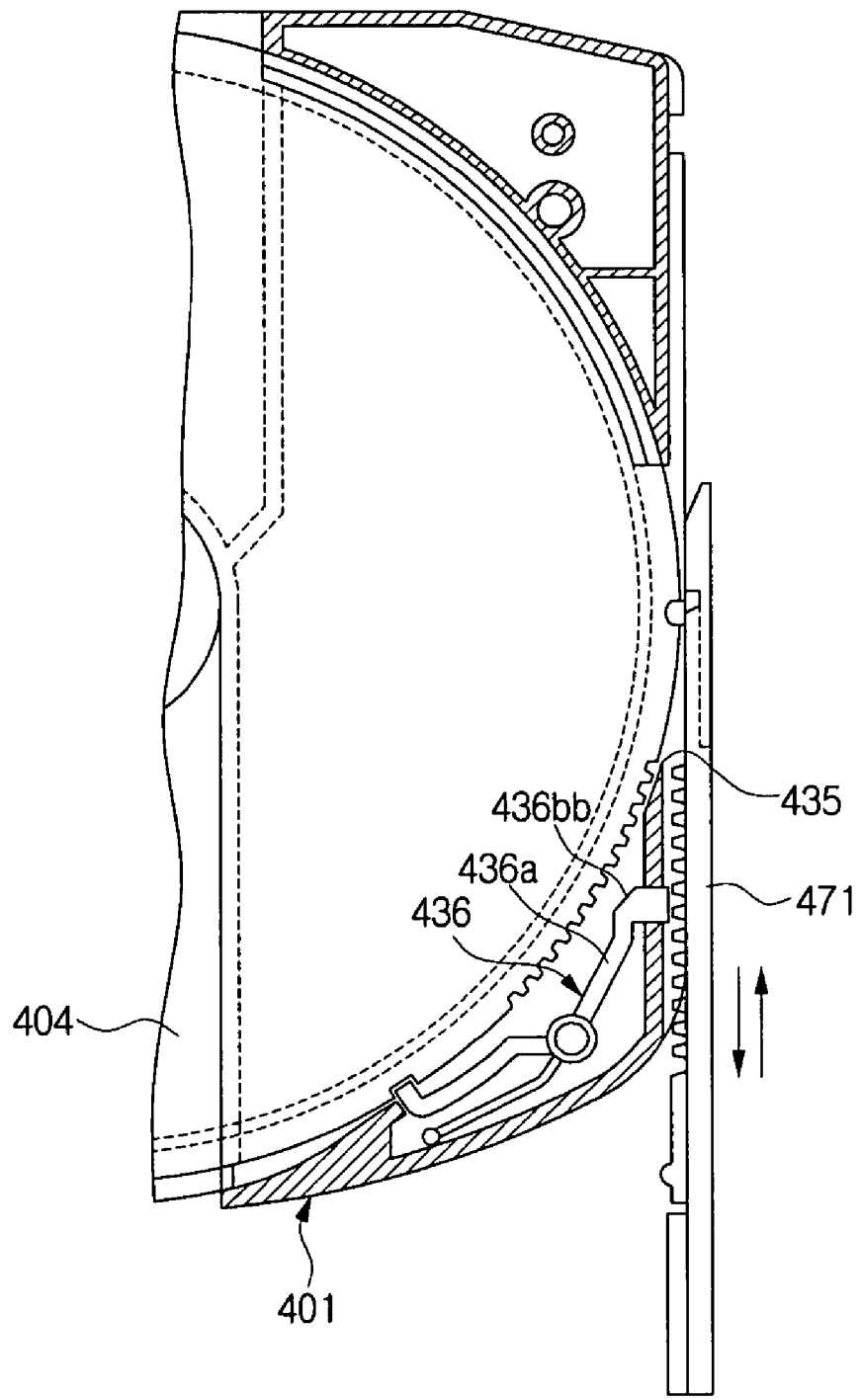
FIG. 2 is a sectional view illustrating the operation of a shutter being opened and closed by a rack member of FIG. 1.
Figure 3:
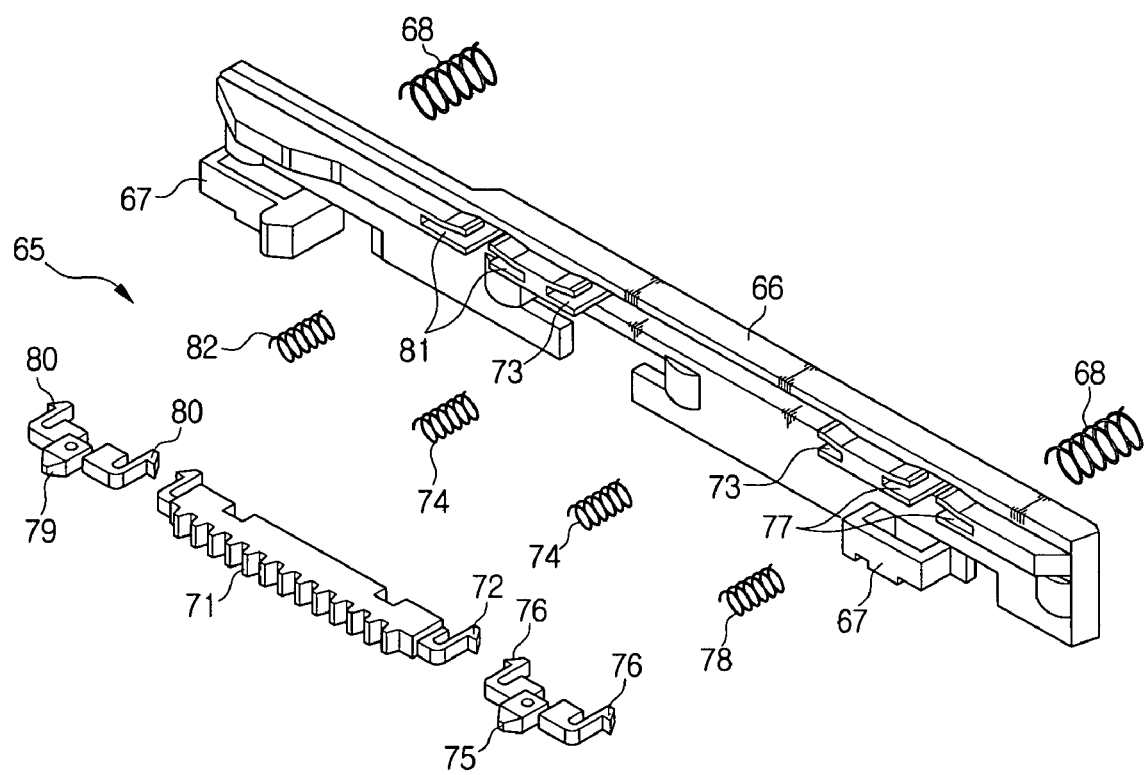
FIG. 3 is an exploded view illustrating the structure of a shutter opening and closing mechanism, such as disclosed in Japanese Patent No. 2003-109282.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Also, well-known functions or constructions are not described in detail.

Figure 4:
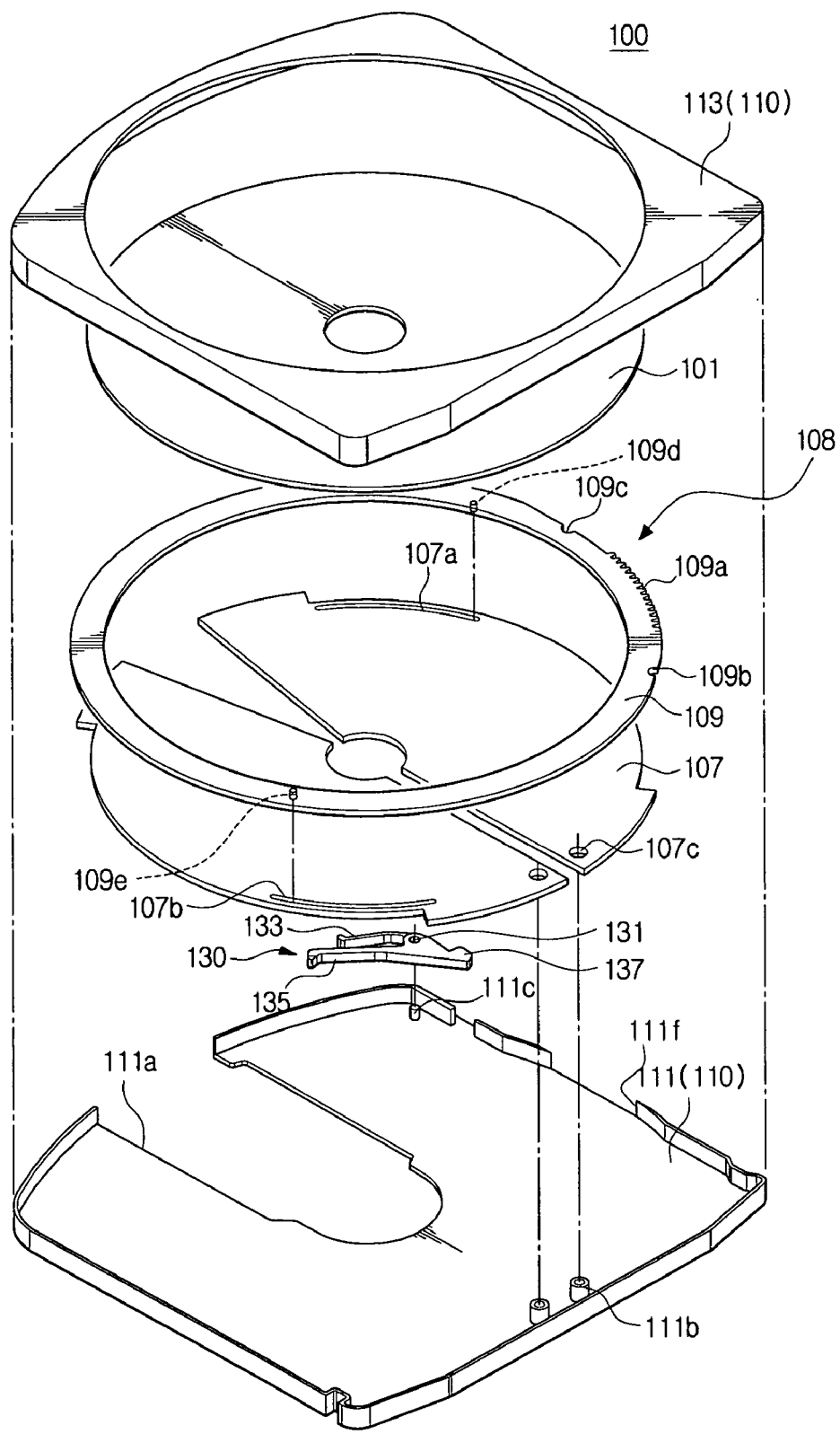
FIG. 4 is an exploded view schematically illustrating the structure of a disc cartridge for a disc recording/reproducing apparatus according to an embodiment of the present invention.

FIG. 4 schematically illustrates the structure of a disc cartridge 100 according to an embodiment of the present invention. Referring to FIG. 4, the disc cartridge 100 includes a case 110 for housing a disc-type recording medium 101 therein and includes a lower case 111 and an upper case 113, a shutter 107, and a rotary wheel 109, as a shutter operating part, to operate in association with the shutter 107 to selectively expose an opening 111a in the lower case 111. The shutter 107 and the rotary wheel 109, as the shutter operating part, form a shutter mechanism 108 that selectively exposes the opening 111a in the lower case 111. The shutter operating part, such as the rotary wheel 109, to operate in association with the shutter, such as the shutter 107, can be communicatively engaged to the shutter or can be integrally formed or combined with the shutter, in aspects of the present invention. The lower case 111 has the opening 111a for exposing the disc-type recording medium 101 to an optical head (not shown) of the disc recording/reproducing apparatus, and a window 111f formed at a predetermined portion of a sidewall of the lower case 111. The shutter 107 selectively exposes and covers the opening 111a, with the shutter 107 exposing the opening 111a when the disc cartridge 100 is mounted in a recording/reproducing position.

In the disc cartridge 100, the rotary wheel 109, as a shutter operating part, is rotated by engagement or interference with a shutter opening/closing unit 250 (FIG. 5), thereby selectively opening and closing the shutter 107. A segment gear 109a is formed on a rim of the rotary wheel 109, and first and second concave cuts 109b and 109c are formed at a predetermined distance, respectively, from both sides of the segment gear 109a. In addition, cam projections 109d and 109e are provided to a bottom of the rotary wheel 109 to open and close the shutter 107 in association with the rotation of the rotary wheel 109. The shutter 107 is provided with cam slits 107a and 107b in which the cam projections 109d and 109e are inserted and slid. The shutter 107 has a hinge hole or aperture 107c for insertion of a support projection 111b formed on the lower case 111, so as to operate in an opening and closing manner with respect to the hinge hole or aperture 107c according to the rotation of the rotary wheel 109.

Also, in the disc cartridge 100, a latch unit 130, as a restraining part, is formed at one side of the lower case 111 to selectively restrain movement or restrict rotation of the rotary wheel 109 to selectively retain the shutter 107 in a predetermined position in the disc cartridge 100, such as a closed position covering the opening 111a in the case 110 of the disc cartridge 100. The latch unit 130 has a substantially Y-shaped configuration, typically formed by molding of synthetic resin. The latch unit 130 includes a latch hinge hole or aperture 131 that fits with a hinge shaft 111c of the lower case 111, a resilient arm 133 that contacts with a side of the lower case 111, a locking arm 135 locked by the first concave cut 109b, and an unlocking arm 137 releasing the locking arm 135. An end of the unlocking arm 137 is partly exposed to the outside of the case 110.

The disc cartridge 100 described above is only an exemplary aspect of the present invention for exposing and covering the opening 111a in an embodiment of the present invention. Therefore, other various structures can be applied within aspects of the present invention to effectively promote these and/or other aspects of the present invention, such as restraining damage of the disc cartridge and noise when the disc cartridge is in a recording/reproducing position in a disc recording/reproducing apparatus.

Figure 5:
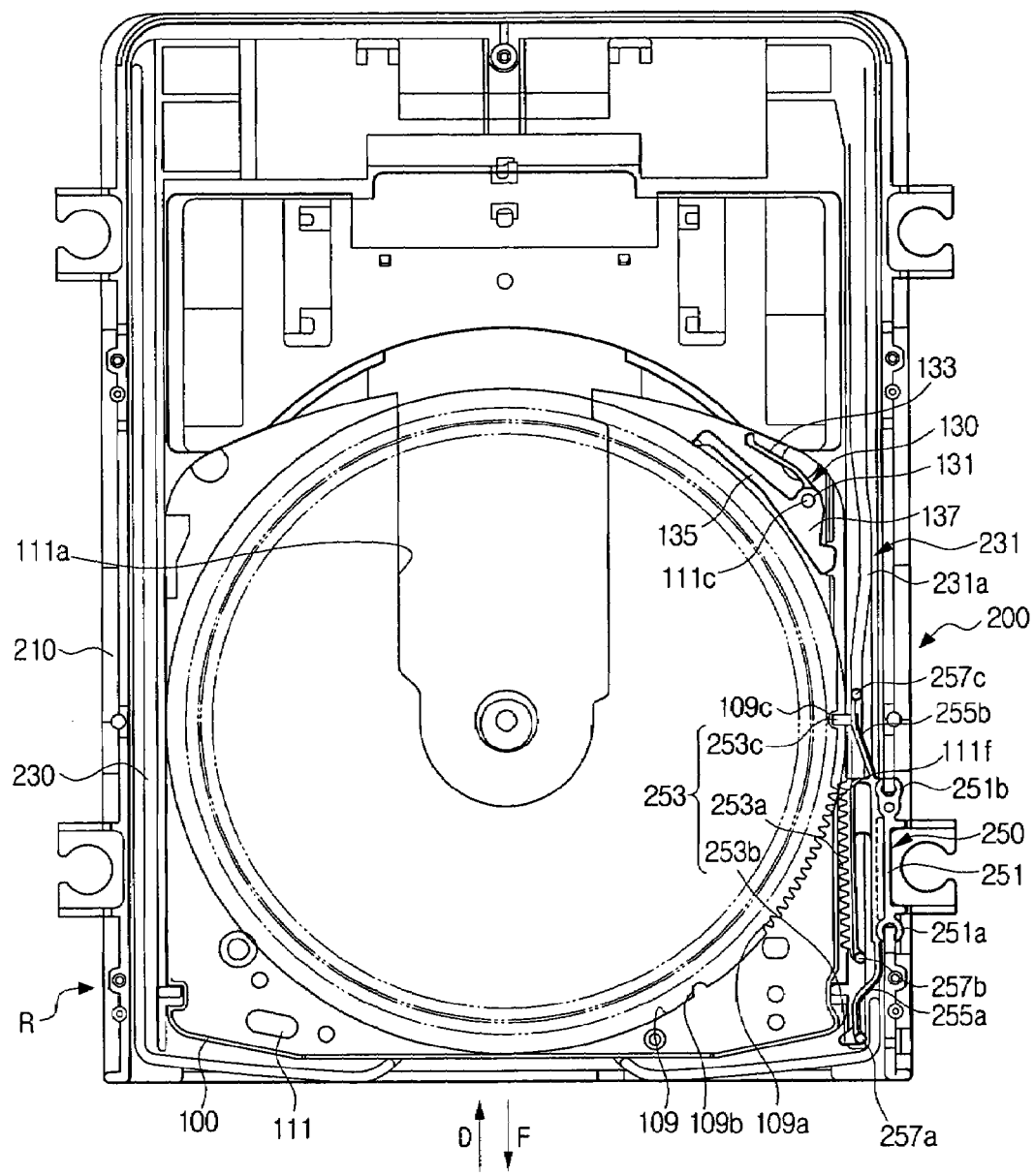
FIG. 5 is a plan view illustrating the structure of a disc cartridge loading device for loading the disc cartridge shown in FIG. 4.

FIG. 5 is a plan view of the disc recording/reproducing apparatus R including a disc cartridge loading device 200 in an embodiment of the present invention. Referring to FIG. 5, the disc cartridge loading device 200 includes a main frame 210, a tray 230, and a shutter opening/closing unit 250. The tray 230 mounts the disc cartridge 100 or a disc-type recording medium alone, such as the disc-type recording medium 101 illustrated in FIG. 4, (not shown in FIG. 5 alone) thereon, and the tray 230 is supported by both sides of the main frame 210, and the tray 230 linearly moves in the arrowed directions D and F through a driving unit (not shown) of the disc recording/reproducing apparatus R. The shutter opening/closing unit 250 mounted at one side of the main frame 210 rotates the shutter 107 through relative operations between the segment gear 109a of the rotary wheel 109 and the first and the second concave cuts 109b and 109c as the tray 230 linearly moves, thereby exposing the opening 111a.

Figure 6:
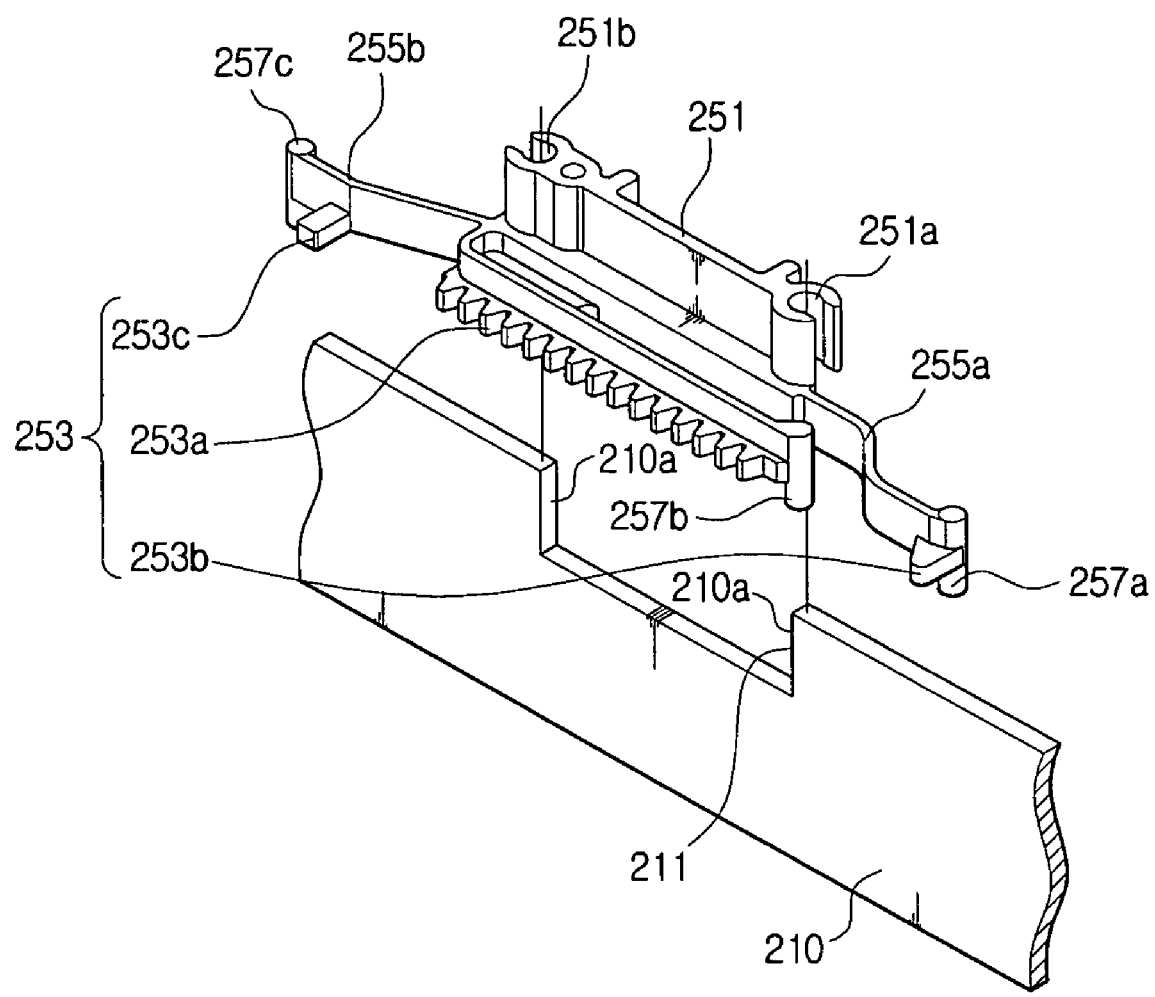
FIG. 6 is an enlarged and perspective view illustrating the structure of a shutter opening/closing unit of the disc cartridge loading device shown in FIG. 5.

FIG. 6 is an enlarged and perspective view showing the structure of the shutter opening/closing unit 250 in an embodiment of the present invention. Referring to FIGS. 5 and 6, the shutter opening/closing unit 250 includes a static part 251 fixed at one side of the main frame 210, and an opening/closing operation part 253 opening and closing the shutter 107, by being engaged or interfered with a shutter operative or operating part of the disc cartridge 100, such as the segment gear 109a, and the first and the second concave cuts 109b and 109c of the rotary wheel 109. The opening/closing operation part 253 includes a rack member 253a that meshes with the segment gear 109a of the rotary wheel 109, and first and second shutter opening/closing projections 253b and 253c that interfere or engage with the first and second concave cuts 109b and 109c and the latch unit, or restraining part, 130. The first and the second shutter opening/closing projections 253b and 253c are formed at first and second connection ribs 255a and 255b which are formed as a cantilever type arrangement on both ends of the static part 251, so as to move forward and backward with respect to the disc cartridge 100.

Continuing with reference to FIGS. 5 and 6, the rack member 253a is also formed as a cantilever type arrangement connected to the static part 251 by one side thereof to move forward and backward with respect to the disc cartridge 100. The first and the second connection ribs 255a and 255b, and the rack member 253a are provided with guide projections 257a, 257b, and 257c at one end thereof, respectively. Fitting parts 251a and 251b are formed on both ends of the static part 251 to engage with a thickness or fitting portion 210a of the main frame 210. The main frame 210 has a cut-out portion 211 on a sidewall thereof corresponding to a length of the static part 251, with the opposing ends of the cut-out portion each forming the fitting portion 210a. Also, the shutter opening/closing unit 250 is typically formed as one body, such as by molding of synthetic resin.

Also, in FIG. 5, a cam 231 is formed on an upper surface of the tray 230 in order to guide the opening/closing operation part 253 of the shutter opening/closing unit 250 forward and backward with respect to the disc cartridge 100. More specifically, the cam 231 guides the operations of the rack member 253a and the first and the second shutter opening/closing projections 253b and 253c, and includes a cam groove 231a in which the guide projections 257a, 257b, and 257c are inserted and slid. The cam groove 231a is configured to be distanced, or spaced, from, or in relation to, the disc cartridge 100 at a portion corresponding to the latch unit 130 when the disc cartridge 100 is mounted to the tray 230, and is curved at a portion corresponding to the window 111f of the lower case 111 to draw the opening/closing operation part 253 of the shutter opening/closing unit 250 toward the disc cartridge 100. According to the above structure of the cam groove 231a, since the rack member 253a recedes from the disc cartridge 100, the rack member 253a avoids contact with the latch unit 130.

As the disc cartridge 100 is loaded on the tray 230 of the disc cartridge loading device 200, and the tray 230 is inserted into the main frame 210, locking of the latch unit 130 is released by the shutter opening/closing unit 250, thereby rotating the rotary wheel 109 by the shutter opening/closing unit 250 and moving the shutter 107 covering the opening 111a of the lower case 111 to uncover the opening 111a, as shown in FIG. 4. Thereafter, when the tray 230 is unloaded from the main frame 210, the rotary wheel 109 of the disc cartridge 100 is rotated by the shutter opening/closing unit 250 in the opposite direction compared to when loading the disc cartridge 100 in the disc cartridge loading device 200. Accordingly, the shutter 107 again covers the opening 111a, and the latch unit 130 is locked again.

A loading operation of the disc recording/reproducing apparatus R in an embodiment of the present invention will now be described in greater detail with reference to FIGS. 7A to 7D, with FIGS. 7A to 7D illustrating the shutter 107 being opened as the disc cartridge 100 is inserted into the main frame 210 of the disc cartridge loading device 200.

Figure 7A:
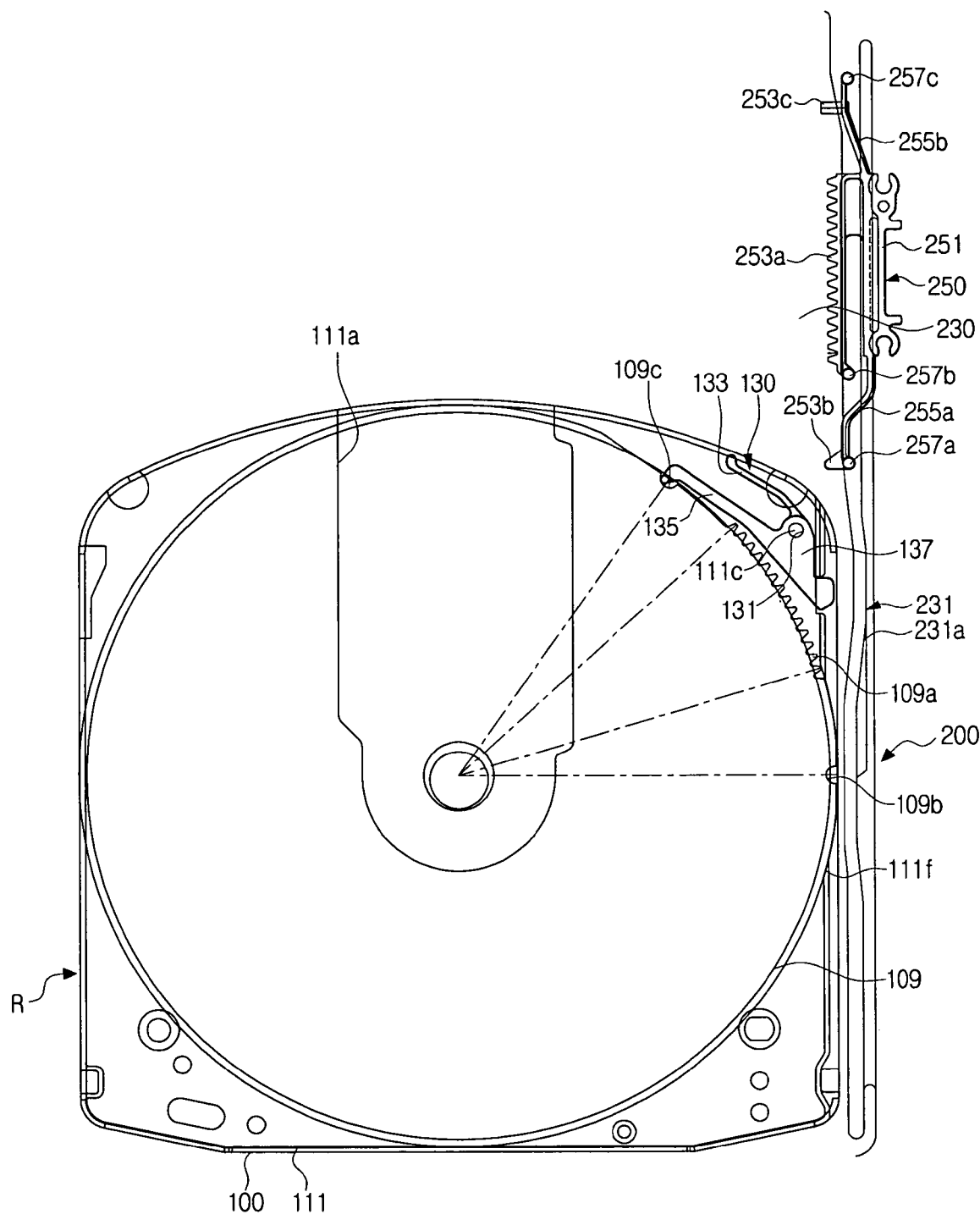
FIGS. 7A through 7D are views for explaining the operation of the shutter being opened as the disc cartridge shown in FIG. 4 is inserted in the disc cartridge loading device of a disc recording/reproducing apparatus in FIG. 5.
Figure 7B:
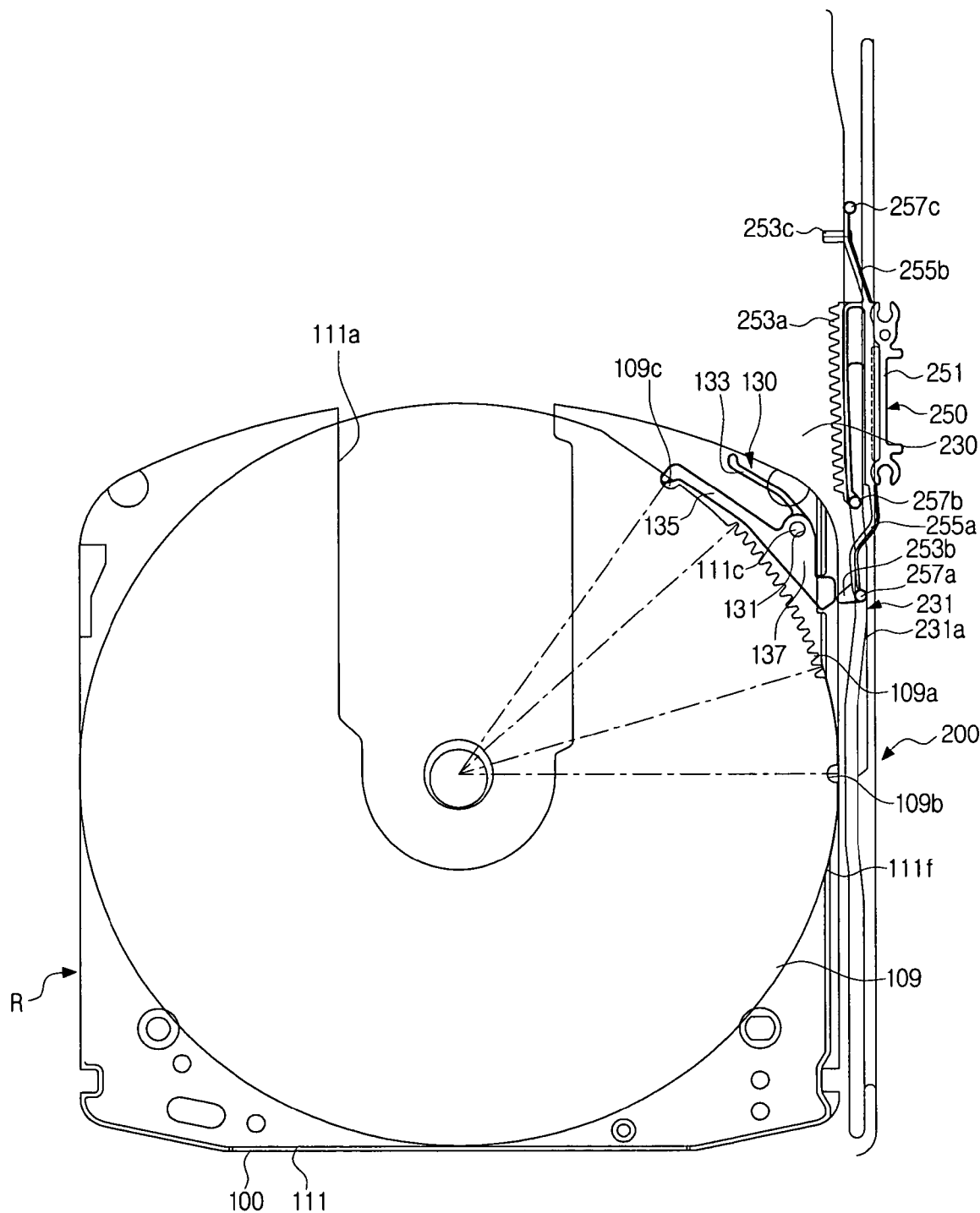

Referring to FIGS. 7A and 7B first, after loading the disc cartridge 100 on the tray 230 and moving the tray 230 to a recording/reproducing position by the driving unit (not shown) of the recording reproducing apparatus R, the first shutter opening/closing projection 253b of the shutter opening/closing unit 250 presses a leading end of the unlocking arm 137 of the latch unit 130. The latch unit 130 is then rotated counterclockwise about the hinge hole or aperture 131 and, accordingly, the leading end of the unlocking arm 137 escapes from the second concave cut 109c, thereby releasing the rotary wheel 109.

Figure 7C:
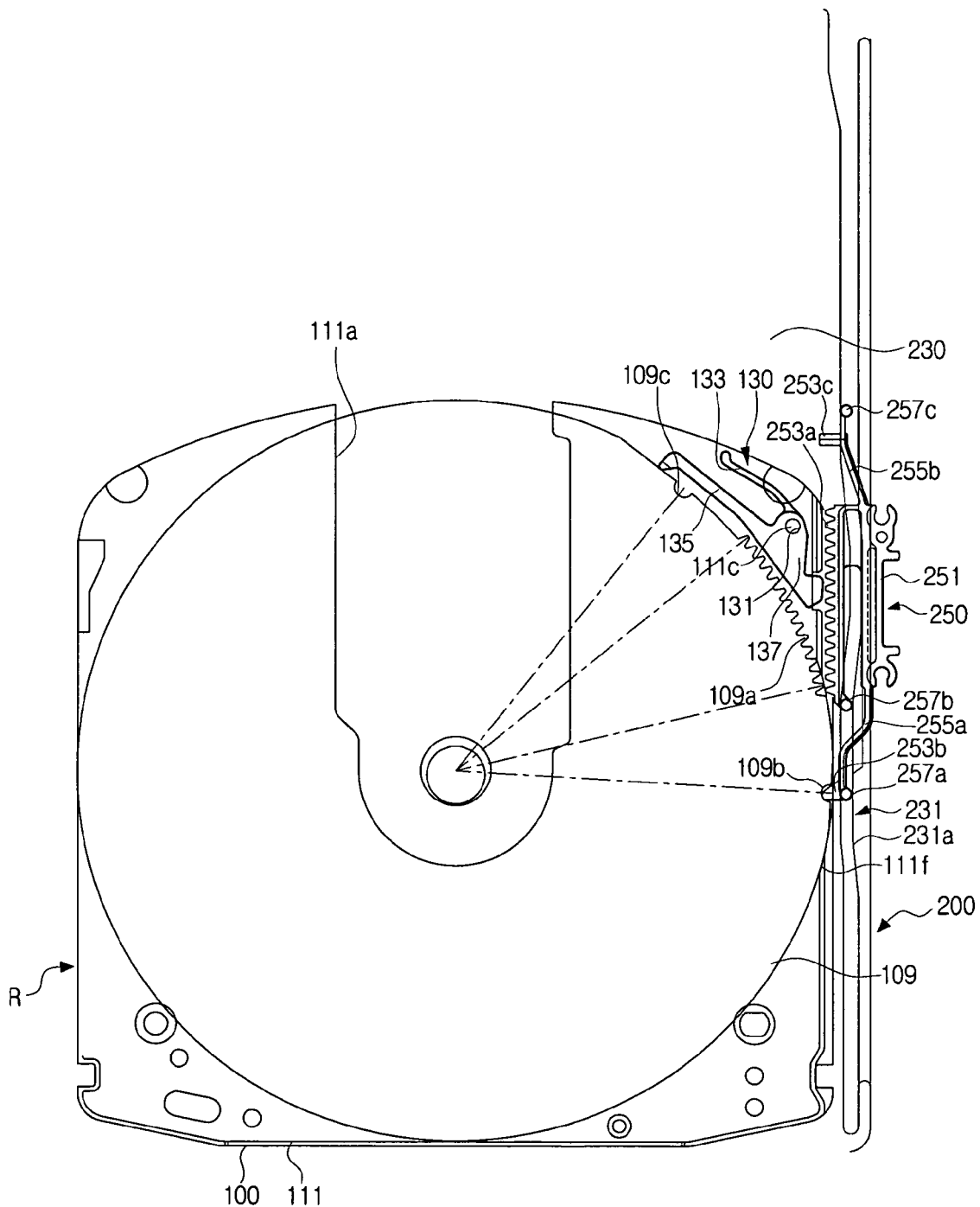

As shown in FIG. 7C, the first shutter opening/closing projection 253b is inserted in the first concave cut 109b so that the rotary wheel 109 is rotated clockwise. Next, the rack member 253a is meshed with the segment gear 109a, thereby rotating the rotary wheel 109. While the rotary wheel 109 is being thus rotated, the shutter 107 (FIG. 4) connected to the rotary wheel 109 through the cam 231 is rotated and, as a result, the opening 111a is exposed.

Figure 7D:
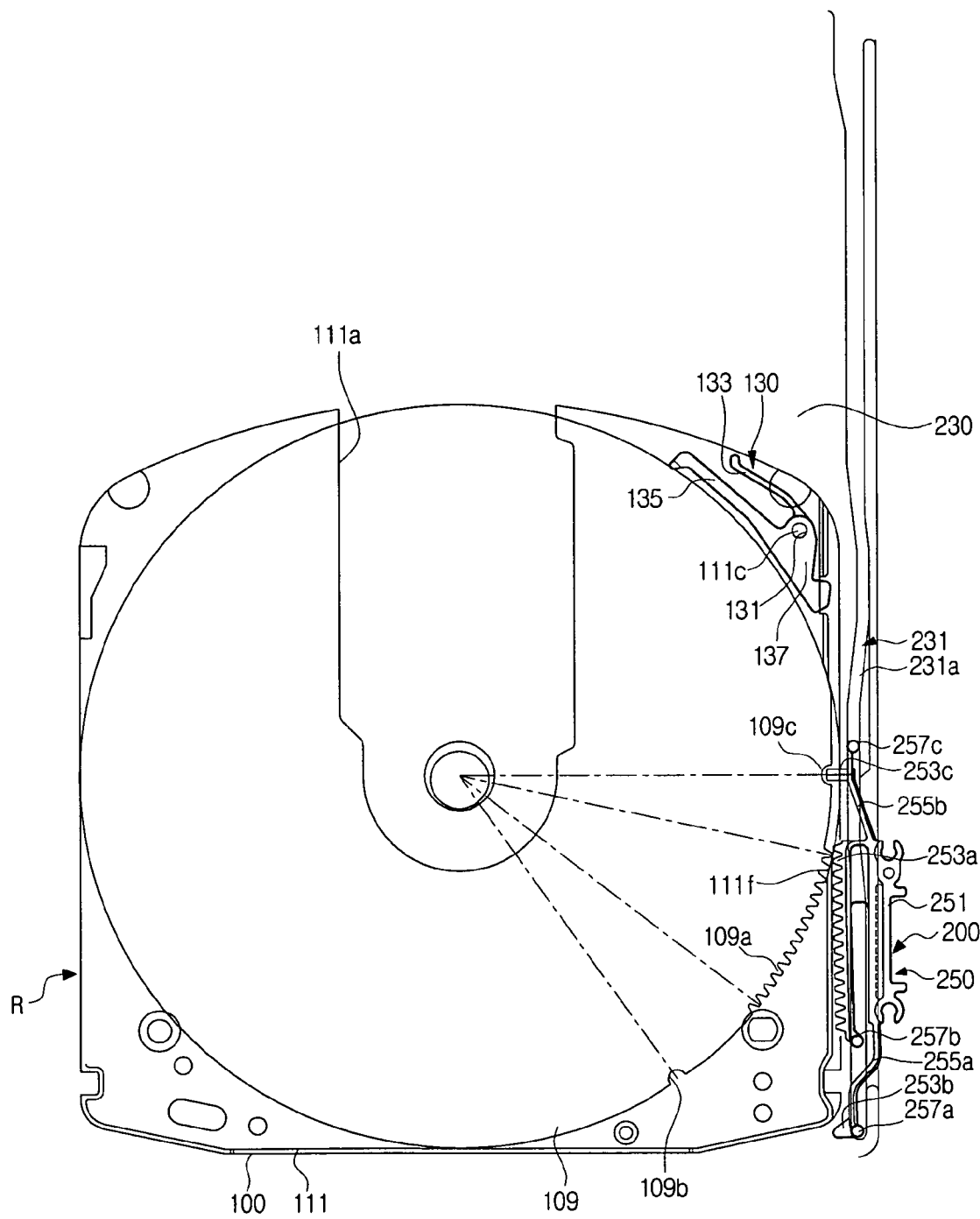

When the rotary wheel 109 is rotated as shown in FIG. 7D, the second shutter opening/closing projection 253c is inserted in the second concave cut 109c. When the tray 230 is completely inserted in the main frame 210 as shown in FIG. 5, the opening 111a is wholly exposed. Moreover, when the tray 230 is withdrawn from the main frame 210, the opening 111a is gradually covered through the above described operations of FIGS. 7A-7D in reverse order.

Therefore, when the disc cartridge 100 is being inserted and withdrawn from the main frame 210, the guide projections 257a, 257b, and 257c of the shutter opening/closing unit 250 are guided along the cam groove 231a formed on the upper surface of the tray 230. As a result, the first and the second shutter opening/closing projections 253b and 253c and the rack member 253a of the shutter opening/closing unit 250 are distanced away, or spaced, from, or in relation to, the disc cartridge 100 when they are located in corresponding relation to the latch unit 130 so that the shutter opening/closing unit 250 avoids contact with the latch unit 130, and they are drawn toward the disc cartridge 100 when they are located in corresponding relation to the window 111f of the disc cartridge 100. As a result, the rack member 253a is not in interfering relation with, or avoids contact with, the latch unit 130.

The foregoing embodiments and advantages are merely exemplary and are not to be construed as limiting the present invention. Also, the description of the embodiments of the present invention is intended to be illustrative, and not to limit the scope of the claims, and various other alternatives, modifications, and variations will be apparent to those skilled in the art. Therefore, although a few embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A disc recording/reproducing apparatus, comprising:
   a main frame;
   a disc cartridge, comprising:
      a case having an opening on a bottom thereof to expose a disc-type recording medium and a window on a sidewall thereof,
      a shutter mounted in the case to expose and cover the opening,
      a rotary wheel to operate in association with the shutter and having a segment gear and a concave cut on a rim thereof, and
      a latch unit formed at one side of the case to control rotation of the rotary wheel;
   a tray to mount the disc cartridge, with the tray moving linearly forward and backward with respect to the main frame;
   a shutter opening/closing unit, comprising:
      a static part to connect to one side of the main frame,
      a rack member formed as a cantilever type arrangement connected to one side of the static part to engage with the segment gear of the rotary wheel, and
      first and second connection ribs formed as a cantilever type arrangement connected to both ends of the static part and having first and second shutter opening/closing projections at one end thereof, respectively; and
   a cam to guide the rack member to contact with the segment gear and be distanced from the latch unit, during an opening/closing operation of the shutter.

2. The disc recording/reproducing apparatus of claim 1, wherein the cam comprises:
   a cam groove formed on an upper surface of the tray, the cam groove to guide the shutter opening/closing unit to be distanced from the disc cartridge when the shutter opening/closing unit is located in corresponding relation to the latch unit and to draw the shutter opening/closing unit toward the disc cartridge when the shutter opening/closing unit is located in corresponding relation to the window formed in the disc cartridge.

3. The disc recording/reproducing apparatus of claim 2, further comprising:
   guide projections at one end of the first and the second connection ribs and the rack member, the guide projections to slide along the cam groove.

4. The disc recording/reproducing apparatus of claim 3, wherein the static part, the first and the second connection ribs, the first and the second shutter opening/closing projections, and the guide projections are integrally formed by injection molding.

5. The disc recording/reproducing apparatus of claim 1, wherein:
   the main frame further comprises a cut-out portion at one side thereof, and
   the static part of the shutter opening/closing unit further comprises fitting parts at both ends thereof, the fitting parts each to engage with a corresponding end of the cut-out portion of the main frame.

6. A disc recording/reproducing apparatus, comprising:
   a main frame;
   a tray to move in and out with respect to the main frame;
   a disc cartridge to mount on an upper surface of the tray, comprising:

a shutter to selectively cover and expose an opening in the disc cartridge that exposes a disc-type recording medium, a shutter operating part to operate in association with the shutter to selectively expose and cover the opening in the disc cartridge, and a restraining part that selectively restrains movement of the shutter operating part to selectively retain the shutter in a predetermined position when the shutter covers the opening in the disc cartridge;

a shutter opening/closing unit, comprising:

a static part fixed on one side of the main frame, and an opening/closing operation part to operate with the shutter operating part of the disc cartridge, the opening/closing operation part being connected to the static part in a cantilever type arrangement to be resiliently moved; and a cam formed at an upper surface of the tray to guide the shutter opening/closing unit to be proximate to the shutter operating part of the disc cartridge and distanced from the restraining part of the disc cartridge, during an opening/closing operation of the shutter.

7. The disc recording/reproducing apparatus of claim 6, wherein the static part and the opening/closing operation part are integrally formed by injection molding.

8. The disc recording/reproducing apparatus of claim 7, wherein the static part is provided with a fitting part to engage with a fitting portion of the main frame.

9. A disc recording/reproducing apparatus, comprising:

a main frame;

a disc cartridge, comprising:

a case having an opening to expose a disc-type recording medium, a shutter to selectively expose and cover the opening in the case, a shutter operating part to operate in association with the shutter to selectively cover and expose the opening in the case, and a restraining part to selectively restrain movement of the shutter operating part to selectively retain the shutter in a predetermined position when the shutter covers the opening in the case;

a tray to position the disc cartridge, with the tray to move with respect to the main frame;

a shutter opening/closing unit to engage with the shutter operating part of the disc cartridge during a shutter opening/closing operation; and a cam to guide the shutter opening/closing unit to contact with the shutter operating part of the disc cartridge and to guide the shutter opening/closing unit to avoid contact with the restraining part of the disc cartridge, during an opening/closing operation of the shutter.

10. The disc recording/reproducing apparatus of claim 9, wherein the cam comprises:

a cam groove on the tray, the cam groove to guide the shutter opening/closing unit during the opening/closing operation of the shutter, and the cam groove to distance the shutter opening/closing unit in relation to the restraining part of the disc cartridge when the shutter opening/closing unit is located in corresponding relation to the restraining part.

11. A disc recording/reproducing apparatus, comprising:

a main frame;

a tray to move with respect to the main frame;

a disc cartridge to position on the tray, comprising:

a shutter mechanism to selectively expose and cover an opening in the disc cartridge that exposes a disc-type recording medium, and a restraining part that selectively restrains movement of the shutter mechanism to selectively retain the shutter mechanism in a predetermined position when the shutter mechanism covers the opening in the disc cartridge;

a shutter opening/closing unit to operate with the shutter mechanism of the disc cartridge during a shutter opening/closing operation to selectively expose and cover the opening in the disc cartridge; and a cam to guide the shutter opening/closing unit to avoid contact with the restraining part of the disc cartridge, during the shutter opening/closing operation.

12. The disc recording/reproducing apparatus of claim 11, wherein the cam comprises:

a cam groove on the tray, the cam groove to guide the shutter opening/closing unit during the opening/closing operation of the shutter, and the cam groove to guide the shutter opening/closing unit to distance the shutter opening/closing unit in relation to the restraining part of the disc cartridge when the shutter opening/closing unit is located in corresponding relation to the restraining part.

13. A disc cartridge loading device, comprising:

a tray to position a disc cartridge, with the tray to move with respect to the disc cartridge loading device;

a shutter opening/closing unit to engage with a shutter mechanism of the disc cartridge to selectively cover and expose an opening in the disc cartridge to selectively expose a disc-type recording medium; and a cam to guide the shutter opening/closing unit to contact with the shutter mechanism of the disc cartridge, and the cam to guide the shutter opening/closing unit to avoid contact with a restraining part of the disc cartridge, during an opening/closing operation of the shutter, the restraining part of the disc cartridge selectively restraining movement of the shutter mechanism to selectively retain the shutter mechanism in a predetermined position when the shutter mechanism covers the opening in the disc cartridge.

14. The disc cartridge loading device of claim 13, wherein the cam comprises:

a cam groove on the tray, the cam groove to guide the shutter opening/closing unit during the opening/closing operation of the shutter, and the cam groove to guide the shutter opening/closing unit to be distanced in relation to the restraining part of the disc cartridge when the shutter opening/closing unit is located in corresponding relation to the restraining part.

15. A disc cartridge loading device, comprising:

a tray to position a disc cartridge, with the tray to move with respect to the disc cartridge loading device;

a shutter opening/closing unit to engage with a shutter operating part associated with a shutter of the disc cartridge to selectively cover and expose an opening in the disc cartridge to selectively expose a disc-type recording medium; and a cam to guide the shutter opening/closing unit to contact with the shutter operating part of the disc cartridge, and the cam to guide the shutter opening/closing unit to avoid contact with a restraining part of the disc cartridge, during an opening/closing operation of the shutter, the restraining part of the disc cartridge selectively restraining movement of the shutter operating part to selectively retain the shutter in a predetermined position when the shutter covers the opening in the disc cartridge.

16. The disc cartridge loading device of claim 15, wherein the cam comprises:

a cam groove on the tray, the cam groove to guide the shutter opening/closing unit during the opening/closing operation of the shutter, and the cam groove to guide the shutter opening/closing unit to be distanced in relation to the restraining part of the disc cartridge when the shutter opening/closing unit is located in corresponding relation to the restraining part.

\* \* \* \* \*